Feb. 12, 1924.                    W. J. COSTELLO                    1,483,843
                                    LIFTING JACK
                                  Filed Sept. 9, 1922

Patented Feb. 12, 1924.

1,483,843

UNITED STATES PATENT OFFICE.

WILLIAM J. COSTELLO, OF PENN TOWNSHIP, ALLEGHENY COUNTY, PENNSYLVANIA, ASSIGNOR OF ONE-HALF TO JOSEPH E. KATZ, OF VERONA, PENNSYLVANIA.

LIFTING JACK.

Application filed September 9, 1922. Serial No. 587,062.

*To all whom it may concern:*

Be it known that I, WILLIAM J. COSTELLO, residing at Penn Township, in the county of Allegheny and State of Pennsylvania, a citizen of the United States, have invented or discovered certain new and useful Improvements in Lifting Jacks, of which improvement the following is specification.

The invention described herein relates to certain improvements in lifting jacks, said improvements rendering the jack especially useful in rail-road work and also for the lifting of automobiles, trucks, and passenger cars. The improvements are hereinafter more fully described and claimed.

In the accompanying drawings forming a part of this specification, Fig. 1 is a side elevation of the improved jack, the lifting lever being shown in its position just prior to the beginning of the lifting movement; Fig. 2 shows a portion of the jack in section the lifting lever and holding pawl being shown in the positions they will occupy when the former has nearly completed its downward or lifting movement; Fig. 3 is a view similar to Fig. 2 the lever having completed its downward movement; Fig. 4 shows the positions of the lever and holding pawl at the beginning of the operation of lowering the vertically movable bar step by step; Fig. 5 shows the position of the lever and pawl as the lever is about to be disengaged from the bar and pushing the pawl into engagement with the bar, and Fig. 6 is a sectional detail view, the plane of section being indicated by the line VI—VI, Fig. 1.

In the practice of the invention the base 1 and hollow standard 2 are preferably formed integral with each other, the standard having slots in opposite sides and also with spaced wings 2ª on one side. The lifting bar 3 which is provided along one side with teeth 4 as is the usual practice, and with a foot 5 on the side opposite that on which the teeth are formed, is inserted into the hollow standard through openings in the base, and on its upper end is secured a head 6. The lifting lever 7 which is provided with teeth 8 adapted to engage the teeth on the lifting bar, is provided with a slot 9 through which passes the pivot pin 10. This slot is made of such a length as to permit of sufficient longitudinal movement of the lever as to disengage the teeth on the lever from those on the lifting bar. In order to prevent a disengagement of the teeth of the lever when moving up or down, a curved recess 11 is formed at the outer end of the slot adapted to engage the pin. The holding pawl 12 is secured on a pin 13 having bearings in the wings 2ª and projecting at the end beyond the wings. On the projecting end of the pin, a head 14 is formed or secured and is provided with a transverse opening in which is slidably mounted a rod 15 having knobs or weights 16 at its ends so that by shifting the rod through the opening in the head one or the other of the knobs or weights will be effective to shift the pawl. When it is desired to raise the lifting bar, the rod will be shifted to cause the pawl to engage the teeth on the bar.

When it is desired to lower the bar step by step, the rod will be shifted to the right in Figs. 1 and 4, such a distance that the right hand knob will become effective to move the pawl out of engagement with the lifting bar, but in order that the pawl may be pushed into engagement with the bar by a cam face on the lever as hereinafter described, the outward movement of the pawl by the weight should be limited. To this end a stop 17 is arranged in the path of the rod, said stop being so located that the outward movement of the pawl will be arrested when its point is clear of the teeth on the lifting bar, as shown in Fig. 4. When lowering the lifting bar step by step, the lever is moved longitudinally to disengage its teeth from the bar, its outer end lowered, and the lever moved inwardly to engage teeth higher up on the bar. The weighted rod is then shifted to the right and the outer end of the lever depressed to raise the bar sufficiently far to release the pawl which will then be moved outwardly by the weighted bar to the position indicated in Fig. 4. The outer end of the lever is then permitted to be raised by the weight on the bar. The lever is formed with a cam surface 18 on its underside which will bear on the pawl when in the position shown in Fig. 4, and push the pawl into engagement with the bar as the inner end of the lever moves down.

When it is desired to drop the lifting bar, the weighted rod is moved sufficiently far to the right to permit the left hand end of the rod to pass beyond the stop 17, so that when the lever is depressed to raise the lifting bar and release the pawl the latter will be moved by the weighted bar to the position shown by dotted lines in Fig. 1. The outer end of the lever is permitted to move up until its teeth pass out of engagement with the teeth on the bar. In order that the weighted rod may not be shifted too far to the right when it is desired to lower the lifting bar step by step, a rib 19 is so formed on the rod that its end will bear against the head 14, when the rod has reached proper position for a step by step lowering. In order to permit the weighted rod to be moved to a position where it will pass the stop 17, the wall of the opening through the head is grooved as at 20 in Fig. 6 for the reception of the rib. By rotating the rod the rib will be moved into or out of alinement with the groove 20.

I claim herein as my invention:

1. A lifting jack having in combination a base, a hollow standard having a slot in one side, a toothed lifting bar arranged in the standard, a lever having teeth and longitudinally movable on its pivotal support to effect the engagement and disengagement of the teeth on the lever with the teeth on the lifting bar, a holding pawl adapted to engage the lifting bar and a weighted member movable relative to the pawl and adapted when in one position to move the pawl in engagement with the lifting bar and in its other position to move the pawl out of engagement with the lifting bar.

2. A lifting jack having in combination a base, a hollow standard, having a slot in one side, a toothed lifting bar arranged in the standard, a lever having teeth to engage the lifting bar, and longitudinally movable on its pivotal support into and out of engagement with the lifting bar, a pin rotatably mounted in the standard and carrying a pawl to engage the lifting bar, a rod having weights on its ends and movable transversely of the pawl pin to shift the pawl into and out of engagement with the lifting bar.

3. A lifting jack having in combination a base, a hollow standard having a slotted side, a toothed lifting bar arranged in the standard, a lever having teeth to engage the lifting bar and longitudinally movable on its pivotal support into and out of engagement with the lifting bar, a pin rotatably mounted on the standard, a pawl carried by the pin, a rod movable transversely of the pin and provided with weights on opposite sides of the pin, a stop for limiting the movement of the pawl away from the lifting bar and a stop for limiting the longitudinal movement of the rod.

In testimony whereof, I have hereunto set my hand.

WILLIAM J. COSTELLO.